United States Patent

[11] 3,617,764

| [72] | Inventors | Chandra K. Patel<br>Summit;<br>Nguyen Van Tran, Matawan Township, both of N.J. |
|---|---|---|
| [21] | Appl. No. | 822,241 |
| [22] | Filed | May 6, 1969 |
| [45] | Patented | Nov. 2, 1971 |
| [73] | Assignee | Bell Telephone Laboratories, Incorporated<br>Murray Hill, N.J.<br>Continuation-in-part of application Ser. No. 690,307, Dec. 13, 1967, now Patent No. 3,461,403, dated Aug., 1969. |

[54] FAR INFRARED WAVE GENERATOR OR MIXER
6 Claims, 7 Drawing Figs.

[52] U.S. Cl. ................................. 307/88.3,
330/4.5, 331/107 R
[51] Int. Cl. ................................. H03f 7/04
[50] Field of Search ........................... 307/88.3;
331/107

[56] References Cited
UNITED STATES PATENTS
2,798,205 7/1957 Hogan ........................... 333/24.1
3,461,403 8/1969 Patel et al. ........................... 307/88.3
3,470,453 9/1969 Fleury et al. ........................... 307/88.3

*Primary Examiner*—Roy Lake
*Assistant Examiner*—Darwin R. Hostetter
*Attorneys*—R. J. Guenther and Arthur J. Torsiglieri ABSTRACT: A phase-matched tunable millimeter wave or far infrared wave generator or mixer employs semiconductor active media having large bound-electron second-order nonlinear effects but which, in particular instances, are not sufficiently birefringent to be phase-matchable by conventional techniques. There is generated a linearly polarized difference-frequency wave for which free carriers (electrons or holes) have the effect of subtracting an appreciable amount from the index of refraction determining its propagation constant. The linearly polarized wave is generated in crystals of the active medium when the frequencies of a pair of input radiations to be mixed and a tuning condition, such as the magnitude of magnetic field applied transversely to the direction of propagation of the input radiations, are appropriately selected. Also, in a parametric oscillator, one radiation is supplied and a second radiation relatively closely spaced in frequency is highly resonated, the frequency of the second radiation and the difference frequency being variable by variation of the magnetic field magnitude.

FAR INFRARED WAVE GENERATOR OR MIXER

RELATED APPLICATION

This application is a continuation-in-part of our pending patent application Ser. No. 690,307, filed Dec. 13, 1967, which now stands allowed.

BACKGROUND OF THE INVENTION

This invention relates to millimeter wave or far infrared wave generators and mixers and to devices to which parametric oscillations are produced by reactive nonlinearities but which, in particular cases, are not phase-matchable merely by employing birefringence.

For purposes of this application, millimeter waves are assumed to have wavelengths between about 1 and 10 millimeters and far infrared waves have wavelengths between 10 $\mu$m. (micrometers) and 1,000 $\mu$m. where 1,000 $\mu$m. equal 1 mm. (millimeter). Those having wavelengths between 100 $\mu$m. and 1,000 $\mu$m. are sometimes called submillimeter waves.

A parametric oscillation is an oscillation in which substantial power is applied at a frequency called the pump frequency; and signal and idler waves, the sum of whose frequencies equals the pump frequency, are generated in an interaction resulting from some nonlinear effect in the crystal. In a mixer, two of the radiations are supplied. These interactions, called nonlinear interactions hereinafter, occur in a distributed way throughout a substantial bulk of material. The particular interactions employed in practicing our invention preferably are generated by nonlinear responses of bound electrons in semiconducting crystals of selected free carrier concentration, even though some of the crystals which will be discussed hereinafter can provide even larger nonlinear responses from a plasma of free carriers in less pure, or more highly doped crystals.

Phase-matching is that condition of coincident propagation of the pump and other interacting wave or waves such that there is a continuously predictable phase relationship among all three and a continuously accumulating power transfer from the pump wave to the signal and idler waves throughout an arbitrarily large distance. Typically, this distance is selected to be larger than a coherence length. A coherence length is the maximum length of material in which the strength of a nonlinear interaction increases in the absence of any special phase matching between the interacting waves.

The prior art now includes a fairly large variety of proposals for parametric oscillators. However, these do not necessarily provide output wavelengths in every desired range.

In the devices of our above-cited related application we have provided a novel technique of phase matching by subtracting the free carrier contribution from the dielectric constant of the material for the interacting wave of lowest frequency. Tuning is typically accomplished by a variable magnetic field colinear with the direction of propagation of input waves; and the output wave is circularly polarized.

It is highly desirable for some applications to produce a linearly polarized output wave.

SUMMARY OF THE INVENTION

According to our invention, we have recognized that a phase-matched millimeter wave or far infrared parametric generator or mixer can produce a linearly polarized output wave in suitable semiconductors, the frequency of the output wave being tuned by appropriate means such as a transverse variable magnetic field, so that the difference-frequency wave is generated as a linearly polarized wave. We provide that the linearly polarized generated wave is phase-matched to the other interacting wave or waves by subtracting the free carrier contribution from the dielectric constant.

In a parametric oscillator, only the highest frequency radiation is supplied as the pumping radiation. The active medium is disposed in an optical resonator including reflectors having high reflectivity in two broad bands. The first band includes the frequency which is relatively close to the pumping frequency; and the other band includes the difference frequency. Both of the resonated frequencies can then be varied by variation of the magnetic field.

More specifically, in one embodiment employing the principal feature of our invention, the tuning condition includes application of a magnetic field of appropriate magnitude transverse to the direction of propagation instead of parallel thereto, as in our above-cited copending application. The direction of the magnetic field is also preferably transverse to the direction of polarization of the input wave or waves.

Examples of the active media are cubic semiconductors of class, $\bar{4}3m$, for example, indium antimonide and indium arsenide or a mixture thereof.

BRIEF DESCRIPTION OF THE DRAWING

Further features and advantages of our invention will become apparent from the following detailed description taken together with the drawing, in which.

DESCRIPTION OF ILLUSTRATIVE EMBODIMENTS

Figure 1:
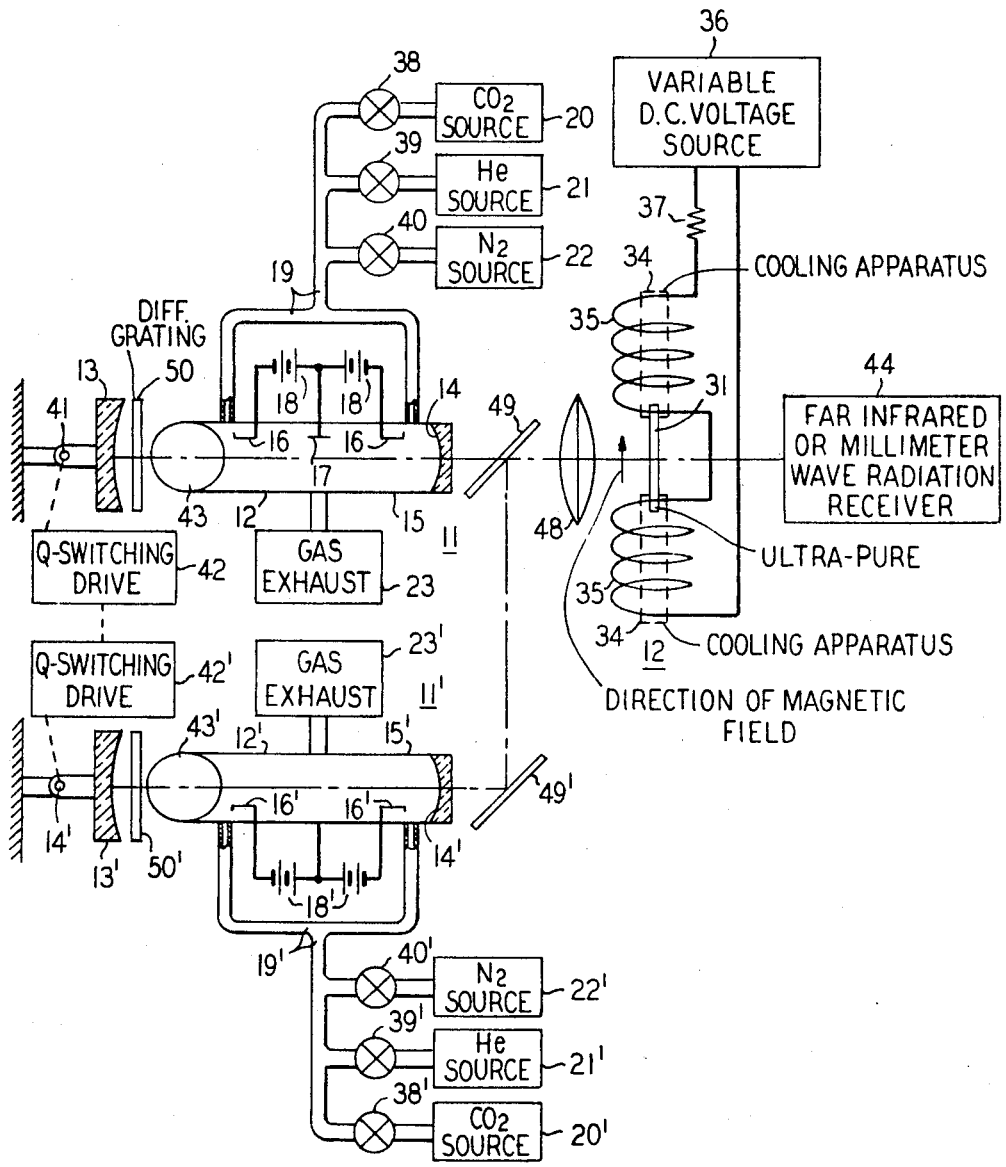
FIG. 1 is a partially pictorial and partially schematic illustration of a first embodiment of the invention.

In HFIG. 1, the carbon dioxide laser 11 is the source of a coherent optical radiation from vibrational-rotational transitions of carbon dioxide at about 9.6 $\mu$m. The laser 11 includes a cylindrical glass or Pyrex tube 12 which contains the gas mixture in which excitation occurs, the partially transmissive reflector 14 forming one end of the optical resonator and of the tube 12. The rotatable reflector 13, which is disposed outside of the opposite transparent Brewster-angle end face 43 of the tube 12, forms the other end of the optical resonator. The end face 43 is oriented to polarize the radiation perpendicular to the plane of the paper. The rotatable reflector 13 is mounted upon a support 41, which permits its rotation. The reflector 13 is rotated by Q-switching drive 42, which could be a suitable servomotor or other means. The transparent faceplate 43 of tube 12 is illustratively potassium chloride. The laser 11 further includes a means 19 for flowing the carbon dioxide, helium and nitrogen gases from sources 20, 21 and 22 into the tube 12 and includes means 23 for exhausting the spent gases from the tube. The proportions of these gases in the tube are controlled by a suitable adjustment of valves 38, 39 and 40, respectively, and a diffraction grating 50 is employed, in order to promote oscillation of a vibrational-rotational transition of the carbon dioxide at a wavelength around 9.6 $\mu$m. The laser 11 further includes means for exciting the gas mixture to enable the stimulated emission of radiation; the excitation means includes DC voltage sources 18, the anode 17 and the cathodes 16.

A carbon dioxide laser 11' substantially identical to the laser 11 is disposed in relation thereto, so that their output beams can be colinearly combined by a dichroic mirror 49. The diffraction grating 50' is employed in order to promote oscillation of a vibrational-rotational transition of carbon dioxide at a wavelength around 10.6 $\mu$m.

The output radiations of the lasers 11 and 11' are focused by a lens 48 upon the active medium 31 of the far infrared or millimeter wave generator. The medium 31 is illustratively a crystalline body, such as a single crystal, of indium antimonide (InSb) having a free electron concentration from $1\times10^{13}$ to $5\times10^{15}$ per cubic centimeter. The generator further includes means 34 for cooling the medium 31, illustratively a conventional cryogenic cooling apparatus including cold fingers disposed upon the medium 31. The generator also includes means for tuning the parametric interaction, including the Helmholtz coil 35, halves of which are disposed on opposite sides of medium 31 orthogonal to the direction of propagation of the incident light for the generation of a linearly polarized difference-frequency wave. Illustratively, the field direction is also orthogonal to the polarizations of the input beams. The generator includes the variable DC voltage source 36 which is connected to coil 35 through a current-limiting resistor 37. The linearly polarized difference-frequency output wave from the medium 31 is received by a receiver 44 suitable for the particular difference frequency that is generated in the medium 31. For example, the receiver 44 might include a crystal, the properties of which are being studied with the aid of the tunable radiation, together with a suitable radiation detector. The detector could be an infrared photoconductive diode detector, or a suitable crystal in a section of waveguide.

Typical operating parameters of the embodiment of FIG. 1 are as follows: The carbon dioxide, helium and nitrogen in laser 11 and in laser 11' are in proportions of 1:10:1, respectively, and provide lasing action on respective L vibrational-rotational transitions separated (illustratively about 9.6 $\mu$m. and 10.6 $\mu$m.) in wavelength (or frequency) by the desired amount. The Q-switching rate is illustratively 120 pulses per second. Nevertheless, it should be understood that lasers 11 and 11' could be operated in a continuous-wave manner, without pulsing. The magnetic field supplied by coil 35 is illustratively 8 kilogauss. The peak pulse powers of the two input radiations lie in the range between 0.5 kilowatt and 50 kilowatts and the lens 48 L focuses them to an area of approximately $10^{12}$ square centimeters in medium 31.

In the operation of the embodiment of FIG. 1, there is no minimum threshold for parametric mixing. Two input waves excite a second-order nonlinear effect of bound electrons in the indium antimonide in medium 31. Consequently, a difference-frequency wave is generated and emitted from body 31 in a narrow beam.

The manner in which this difference-frequency wave is linearly polarized can be explained as follows: We first define propagation constant of linearly polarized wave, $k_3 = n_3 \omega_3 / c$ where $\omega_3$ is the angular frequency of difference-frequency, $n_3$ is the effective index of refraction for linearly polarized wave at $\omega_3$, $c$ is the velocity of light in vacuum.

It remains to explain how the effective indices of refraction $n_3$ can be sufficiently lower than the usual low-frequency index of refraction so that the effect of dispersion is offset and phase matching is made possible. We have found that there is energy exchange between the low effective-mass charge carriers in body 31 and the propagating waves and especially between such charge carriers and the relatively low-frequency output wave, or difference-frequency wave. At sufficiently low frequencies, there is a substantial exchange of energy. Thus, it is important for obtaining a useful output that $\omega_3$ not be too close to the cyclotron resonance frequency $\omega_c$. Specifically, $|\omega_3 - \omega_c| \tau \gg 1$, (1) where $\tau$ is the relaxation time, or average time between collisions for an individual free electron, and the double inequality sign implies that the left-hand side of the inequality is much larger, at least one order of magnitude larger, than unity.

More specific conditions desirable in the case of infrared outputs are the following:

$\omega_3 \tau \gg 1$ (1a),
$\omega_c \tau \gg 1$ (1b),
$\omega_3 > \omega_c$ (1c). Moreover, for the medium to be lossless,
$\omega_3 \ll \omega_{T0}$, (2)

where $\omega_{T0}$ is the frequency of the transverse optical phonon. $\omega_3$ should be substantially different from the plasma frequency, $\omega_P$, where the plasma frequency is defined as follows:

$$\omega_P = \sqrt{\frac{4\pi N e^2}{m^* \epsilon_\infty}} \quad (3)$$

where N is the charge carrier concentration per cubic centimeter, $e$ is the charge of an electron, $\epsilon_\infty$ is the high-frequency dielectric constant of the medium, and $m^*$ is the effective mass of a free electron in the solid medium 31. The techniques for determining the frequency of the transverse optical phonon and the cyclotron resonance frequency are well known and will not be set out in detail here.

It suffices to say that all of the foregoing conditions can be satisfied for purposes of our invention by employing, in the embodiment of FIG. 1, a transverse magnetic field and relatively pure crystals having charge carrier concentrations between $1\times10^{13}$ and $5\times10^{15}$ per cubic centimeter. The applied transverse magnetic field has a relatively weak strength or magnitude, such that $\omega_c < \omega_3$. Moreover, the above-described conditions are readily satisfied with these concentrations and cyclotron frequencies if crystals of the cubic class ($\overline{4}3m$) are employed in the embodiment of FIG. 1. Indium antimonide is such a crystal; so are indium arsenide, gallium arsenide, and gallium phosphide. Other members of this class of materials are also well known. It can be shown that the dielectric constants $\epsilon_3$ corresponding to the indices of refraction $n_3$ are given as follows:

$$\epsilon_3 = \epsilon(\infty) + \frac{\delta}{w_{T0}^2 - \omega_3^2} - \frac{w_P^2 \beta}{\omega_3^2 \beta^2 + \frac{\alpha^2}{\tau^2}} \quad (4)$$

where $$\alpha = 1 + \frac{w_3^2 w_c^2}{\omega_3^2 + (\omega_3^2 - \omega_P^2)^2 \over \tau^2} \quad (5)$$

and $$\beta = 1 - \frac{w_P^2(\omega_3^2 - \omega_P^2)^2}{\omega_3^2 + (\omega_3^2 - \omega_P^2)^2 \over \tau^2} \quad (6)$$

where $\delta$ is a constant depending upon the material. The corresponding effective indices of refraction are the square roots of these quantities.

Several facts may be noted from the above equations. First, the effective index of refraction for the two input waves is essentially the same as that at infinite frequency and is given by the first term on the right-hand side of each of the above equations. Secondly, the second terms on the right-hand side of the above equations represent normal dispersion from infinite frequency to the relatively low frequency $\omega_3$. Finally, the last terms on the right-hand sides of the above equations represent the effects of free carriers upon linearly polarized components of waves at frequency $\omega_3$. The size and sign of the last terms are determinative of the ability to phase-match, but should also be associated with relatively low losses for all three waves in order to be useful. For $\omega_c < \omega_3$, the last term of equation 4 is subtractive and cancels the second term of right-hand side of equation 4 and allows us to obtain phase-matched generation of linearly polarized difference-frequency. The phase matching condition is extremely sensitive to variations in the relatively small magnetic field.

Therefore, for the adjustment of parameters given above, receiver 44 will receive a linearly polarized difference-frequency wave in a narrow coherent beam.

Our experiments have produced generated power of the order of a few milliwatts per square centimeter of cross section of the interaction in the medium 31 in such a mixer. More detailed experimental results are as follows:

The two separate but synchronously Q-switched $CO_2$ lasers 11 and 11' were used for the generation of ~250 nsec long linearly polarized pulses with peak power of ~1 kw. at 9.6 $\mu$ ($\omega_1$) and 10.6 $\mu$ ($\omega_2$). Pulse repetition rate was 120 Hz. The two beams were combined with the dichroic mirror 49 and were focused with the 40 cm. focal length lens 48 onto a polished sample of n-type InSb in the Voigt configuration $(\underline{E} \omega_1 \quad$ and $k_{1, 2} \perp B)$.

Gratings within the optical cavities of the two $CO_2$(43m), lasers allowed us to select any one of the number of lasing transitions at 9.6 $\mu$ and 10.6 $\mu$ and thus enabled us to vary $\omega_3$ with appropriate adjustment of the magnetic field, from 95 cm.[11] to 105 cm.[11]. Two InSb samples, having $l \approx 4$ mm. and $n_e \approx 1.6 \times 10^{15}$ cm.[13] and $2.2 \times 10^{15}$ cm.[13] and $\mu \approx 2-3 \times 10^5$ cm.[2] V[11] sec.[11] (77° K.) were studied. Orientation of the samples was $$\underline{E}\,\omega_1,\underline{E}\,\omega_2\,||<111>, \text{ and } \underline{k}_1, \underline{k}_2\,||\,\underline{l}.$$

Far IR output $\omega_3 \approx 100$ cm.[11] was analyzed with [1] grating spectrometer and detected with a In:Ge (4.2° K.) detector, both in receiver 44.

Figure 5A:
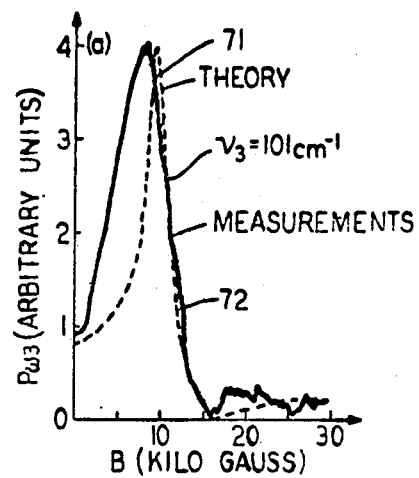
FIGS. 5A–5C show curves useful in explaining the invention.

FIG. 5A shows the relative power output at $\omega_3 = 101$ cm.[11] ($\omega_2 = 944.15$ cm.[11], $\omega_1 = 1045$ cm.[11]) in curve 71 (solid) as a function of B for the $n_e \approx 1.6 \times 10^{15}$ cm.[13] sample at T≈67° K. On the same graph we also show the theoretical curve 72 (dotted). There is reasonable agreement in the value of B at which measured and calculated phase matching occurs. However, the width of the measured phase matching curve is somewhat larger than the calculated one. This is understood when we remember the fact that the electron concentration in practical InSb samples is not uniform over samples of finite size. The equations above can be used to show that, for a fixed $\omega_3$, the magnetic fields at which phase matching occurs is different for different $n_e$. It is estimated that a nonuniformity in $n_e$ of ±20 percent from the nominal value of $1.6 \times 10^{15}$ cm.[13] will cause a broadening of the phase-matching curve which agrees with the measured results. In InSb, additional nonuniformity in $n_e$ arises from the two-photon-injected plasma. This difficulty can be avoided in InAs:InSb compounds having a gap which is somewhat larger than $2\hbar\omega_1$.

Figure 5B:
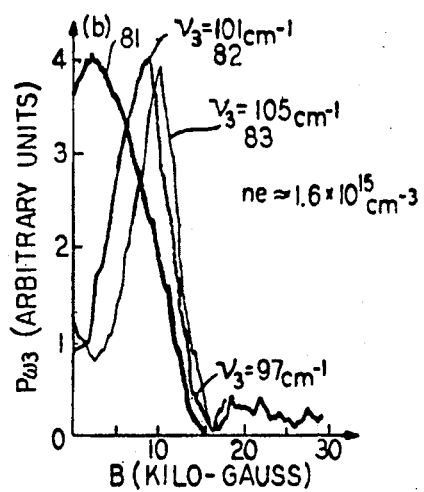
Figure 5C:
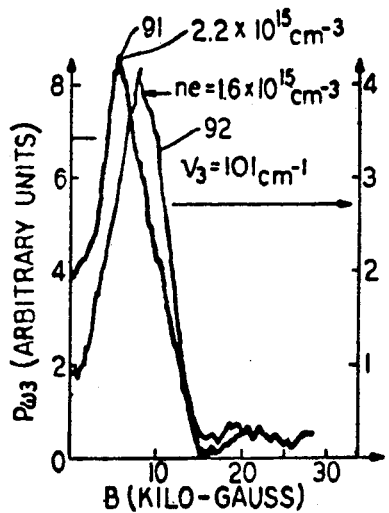

FIG. 5B shows relative $P_{\omega_3}$ when $\omega_3$ is changed from 97 cm.[11] (curve 81) to 101 cm.[11] (curve 82) to 105 cm.[11] (curve 83) by choosing the frequencies $\omega_1$ and $\omega_2$ to have those frequency differences (1 cm.[11]=30 GHz.). The tunable nature of the phase matching is evident and the magnetic field B dependence is correctly predicted by using the above equations. Finally in FIG. 5C we show the $P_{\omega_3}$ at $\omega_3=101$ cm.[11] for $n_e = 1.6 \times 10^{15}$ cm.[13] and $2.2 \times 10^{15}$ cm.[13] samples as a function of magnetic field B. The expected shift of B required by the equations for phase matching when $n_e$ is changed is verified.

For InSb with $n \approx 1.6 \times 10^{15}$ cm.[−3], the maximum $P_{\omega_3}$ (observed) at $\omega_3 = 101$ cm.[−1] was estimated to be $\sim 1\mu W$ for $P_{\omega_1} \approx P_{\omega_2} \approx 1$ kw. and $w^2 \approx 5 \times 10^{-3}$ cm.[2], where w is the diameter of the beam waist. From this we estimate the nonlinear coefficient $d_{14}$ ($\omega_3 = \omega_1 - \omega_2) \approx (3.5 \pm 1) \times 10^{-7}$ for InSb. Accuracy is determined by uncertainty in power 101 measurements, time variation of the two synchronized incident optical pulses and by uncertainty in the value of $w$, in the crystal. The value of $d_{14}$ of InSb we have obtained at such far infrared frequencies is smaller than $d_{14}$ of InSb at near infrared frequencies.

The foregoing examples show that using a pair of $CO_2$ lasers, it is possible to generate microwatts of linearly polarized coherent power at discretely tunable frequencies in the 100 cm.[11] range. Since $CO_2$ lasers can be tuned from 9.1 $\mu$ to 9.8 $\mu$ and 10.2 $\mu$ to 10.8 $\mu$, $\omega_3$ can be tuned from 10 cm.[11] to 150 cm.[11] to cover the entire far IR.

The embodiment of FIG. 1 may be modified readily for use as a parametric oscillator, as will be explained hereinafter in reference to FIG. 4.

Figure 2:
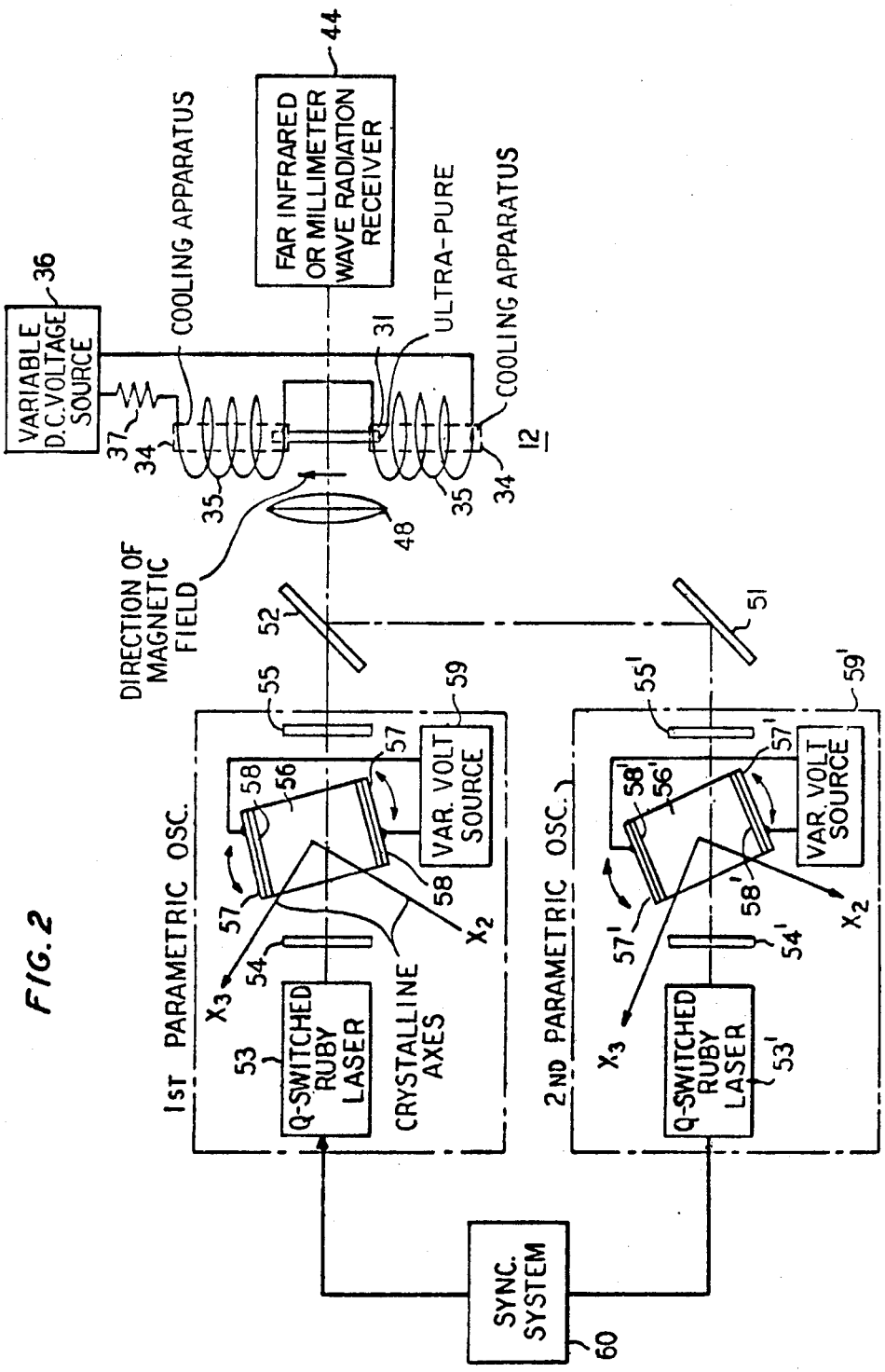
FIG. 2 is a partially pictorial and partially schematic illustration of a second embodiment of the invention in which two parametric oscillators are used as sources of the two input waves for the millimeter wave or far infrared wave generator.

In the embodiment of FIG. 2, the generator is adapted primarily for the purpose of generating waves of a completely continuous wide range of frequency, including millimeter-wave frequencies. This is done by supplying the input waves from two different continuously tunable sources so that the input waves can be tuned to be arbitrarily separated in frequency. Each of the sources in the embodiment of FIG. 2 is a lithium niobate parametric oscillator. The output from the lower parametric oscillator is directed into medium 31 by means of the 45° reflector 51 and the 50 percent reflective 45° reflector 52, which is disposed between the first parametric oscillator and the lens 48. The output of the first parametric oscillator is admitted to the medium 31 by partial transmission through the 50 percent transmissive reflector 52. The two parametric oscillators include, respectively, the Q-switched lasers 53 and 53', optical resonators including multiple-layer dielectric mirrors 54 and 55 in the first oscillator and 54' and 55' in the second oscillator, and respective nonlinear-active media in the optical resonators. Specifically, these active media are the lithium niobate crystals 56 and 56', respectively. Electrodes 57 and 57' are employed for the application for the tuning electric field and are separated from the crystals 56 and 56', respectively, by Teflon spacers 58 and 58'. The tuning of the parametric oscillators is further facilitated by mounting the crystals 56 and 56' so that they can be rotated about an axis orthogonal to the indicated crystalline axes $X_2$ and $X_3$. It will be seen that the angular orientations of crystals 56 and 56' differ slightly. The electrodes 57 are connected to opposite terminals of a variable voltage source 59; and the electrodes 57' are connected between opposite terminals of a variable voltage source 59'. Illustratively, the crystals 56 and 56' are 0.7 centimeter long and are oriented so that the pump waves from lasers 53 and 53' are extraordinary waves with wave normals in the $X_2X_3$ plane at angles between 0° and 50° with respect to the optic axis. The Q-switched lasers 53 and 53' are like lasers 11 and 11' of FIG. 1 and are coupled together by a synchronization system 60, which illustratively includes suitable reflectors and prisms (not shown) adapted to direct beams from one to the other. Further adjustments of the parametric oscillators are considered to be within the present state of the art in view of such articles as that of L. B. Kreuzer, "Ruby-Laser-Pumped Optical Parametric Oscillator with Electrooptic Effect Tuning" in Applied Physics Letters, Volume 10, page 336, June 15, 1967.

In operation, the tunable parametric oscillators of FIG. 2 illustratively generate waves having frequencies separated by a desired far infrared or millimeter-wave frequency. To achieve this frequency separation, one could employ both of the signal waves from the parametric oscillator or both of the idler waves. Which is used would be selected by suitable filters (not shown) following reflectors 55 and 55'. Let us assume that the idler waves are used and that these both have wavelengths of near 2 microns. Receiver 44 remains the same as in the embodiment of FIG. 1. The frequency of the generated difference-frequency wave can be varied by simultaneously rotating crystals 56 and 56' through appropriate small angles and simultaneously changing the magnitude of the field applied to medium 31 by coil 35. The magnetic field is applied in a direction transverse both to the direction of polarization and the direction of propagation of the output waves from the parametric oscillators. Its orientation in the drawing is shown in the plane of the paper only for convenience. The sense of the difference-frequency variation can be determined from equation 4. The difference-frequency wave will be linearly polarized.

Figure 3:
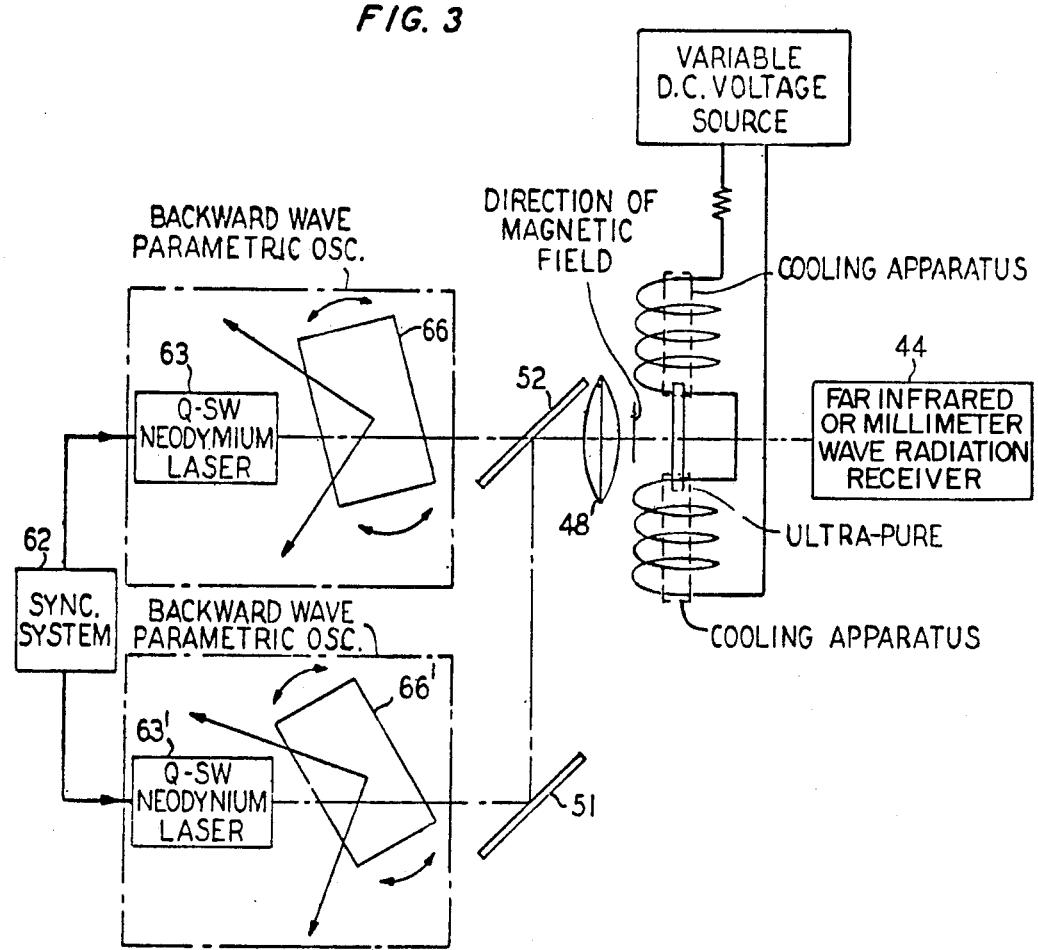
FIG. 3 is a partially pictorial and partially block diagrammatic illustration of a third embodiment of the invention in which two backward wave oscillators are used as the sources of the two input waves.

In FIG. 3, the mixer configuration is similar to that of FIGS. 1 and 2. This embodiment differs in that the parametric oscillators are selenium backward-wave oscillators that do not require an optical resonator. The selenium crystals 66 and 66' are mounted for rotation about an axis orthogonal to the propagation direction of the pumping light and are pumped by Q-switched neodymium lasers 63 and 63' operating at 1.06 microns.

In this embodiment, one employs output idler frequencies from the two parametric oscillators, since the signal waves propagate in the backward direction toward lasers 63 and 63' The idler frequencies are spaced by the desired far infrared or millimeter-wave frequency. Further details of the adjustment of such selenium backward-wave oscillators may be found in the article by S. E. Harris, "Proposed Backward Wave Oscillation in the Infrared," Applied Physics Letters, Volume 9, page 114, Aug. 1, 1966 Again, the magnetic field is applied transverse to the directions of propagation and polarization of the waves from the parametric oscillators and with a magnitude appropriate for phase-matching the linearly polarized output wave.

The wave generators described above can be called mixers because two input waves are supplied.

In some circumstances, greater flexibility in tuning can be achieved in a parametric oscillator. In this case, a single input radiation is supplied; and the device is arranged so that the threshold for parametric oscillations is exceeded.

Figure 4:
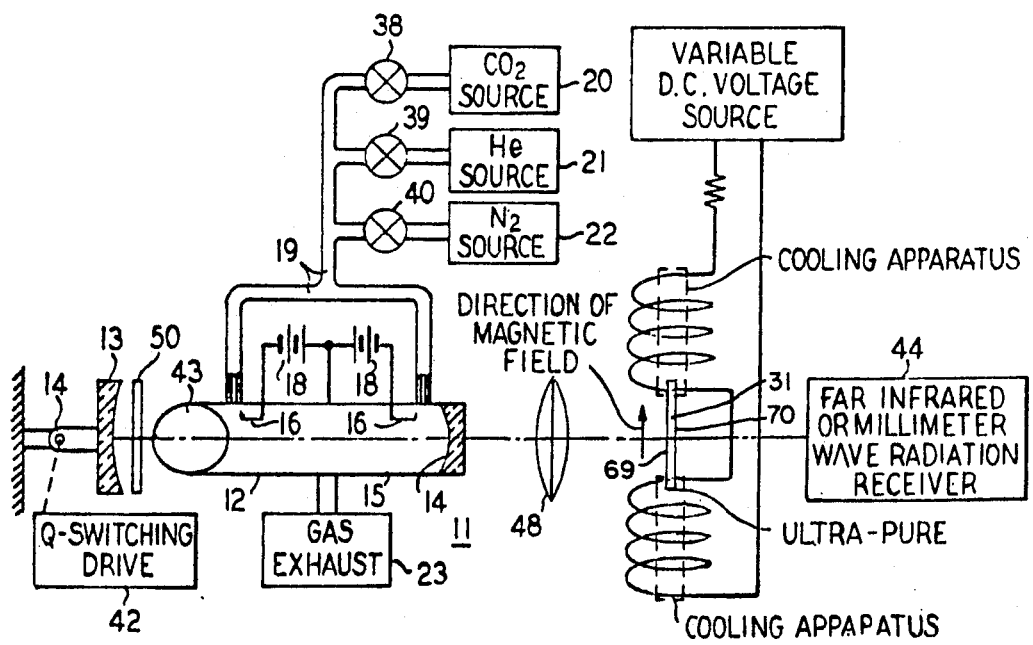
FIG. 4 is a partially pictorial and partially block diagrammatic illustration of a fourth embodiment of the invention employed as a parametric oscillator.

A tunable parametric oscillator of this type is illustrated in FIG. 4. This embodiment differs from the embodiment of FIG. 1 in the following respects.

First, pumping radiation of essentially only a single frequency is supplied from a single laser 11. The laser is adjusted to operate on only one transition, by use of a suitable grating 50.

Second, the body 31 is provided with an optical resonator comprising reflectors 69 and 70, which are placed on body 31 on the faces orthogonal to the common direction of propagation of the radiations. Reflectors 69 and 70 each include multiple dielectric coatings adapted to be more than 90 percent reflective in a first band beginning at a frequency just below the pump frequency and ending at a frequency above any of the characteristic far infrared absorption frequencies of body 31. The reflectors 69 and 70 are designed also to be highly reflective in a second frequency band, equal in breadth to the first, beginning at a frequency of 3 gigahertz (kilomegacycles per second) and extending into the far infrared, but well short of the absorption frequencies. Such double-peaked and relatively broadband multiple dielectric reflectors are now well known in the art.

The magnetic field is applied as in the preceding embodiments. Illustratively, this field could be 8 kilogauss in FIG. 4.

In operation, the generated signal and idler frequencies are both linearly polarized. The frequencies of the signal and the idler can be continuously changed by changing the value of the magnetic field. They remain linearly polarized because the magnetic field is transverse.

The thresholds for parametric oscillation, estimated from various gain measurements and loss calculations, can be reached with available components of the type described. With respect to this point, it may be pointed out that the mixers, such as those of FIGS. 1-3, are not characterized by thresholds for operation and are advantageous in that respect. Nevertheless, the parametric oscillator of FIG. 4 is advantageous despite its threshold when the problems of synchronizing and/or aligning two sources are desired to be avoided.

We claim:

1. A nonlinear optical device of the type in which a semiconductive material composed to have nonlinear reactive responses to optical waves and doped to provide a selected level of free carriers is subjected to a magnetic field affecting said free carriers and is pumped by at least one coherent optical wave to which said material is responsive, said device being characterized by means for applying said magnetic field transverse to the direction of propagation of said wave and with variable magnitude appropriate for tuning said device by an effect of said free carriers upon the dielectric constant of said material at a frequency below the frequency of said wave to provide a phase-matched interaction at said frequencies and a linearly polarized output wave.

2. A nonlinear optical device of the type claimed in claim 1 including means for supplying the coherent optical wave with linear polarization and in which the magnetic field applying means is oriented to apply the magnetic field to the material in a direction orthogonal to the linear polarization direction of the coherent optical wave.

3. A nonlinear optical device of the type claimed in claim 2 in which the semiconductive material is of the type having a low effective mass of free charge carriers, as compared to mass in vacuum, and in which the material has a concentration of free charge carriers between $1\times10^{13}$ and $5\times10^{15}$ per cubic centimeter.

4. A nonlinear optical device of the type claimed in claim 3 in which the semiconductive material is a material of class $\overline{4}3m$, said device including a second means for supplying a coherent optical wave with linear polarization parallel that of the first coherent optical wave, said first and second wave-supplying means being molecular lasers tuned to operate on different single vibrational-rotational transitions differing in frequency by the frequency of a linearly polarized wave which is phase-matched to said coherent optical waves in the presence of the transverse magnetic field.

5. A nonlinear optical device of the type claimed in claim 1 including means for supplying two colinearly propagating linearly polarized coherent optical waves, the field being of a magnitude at which a linearly polarized wave of frequency below the frequencies of said waves is phase-matched to said waves.

6. A nonlinear optical device of the type claimed in claim 1 including means for resonating signal and idler waves which are phase-matched to the pumping coherent optical waves in the presence of the magnetic field, the field being orthogonal to both the propagation direction and the polarization of the pumping wave, whereby the phase-matched signal and idler waves are linearly polarized.

* * * * *

UNITED STATES PATENT OFFICE
CERTIFICATE OF CORRECTION

Patent No. 3,617,764    Dated November 2, 1971

Inventor(s) Chandra K. N. Patel and Nguyen Van-Tran

It is certified that error appears in the above-identified patent and that said Letters Patent are hereby corrected as shown below:

Column 1, line 11, after "devices" delete "to" and substitute --in--.

Column 2, line 38, after "In" delete "HFIG." and substitute --FIG.--;

line 41, after "Pyrex" insert superscript --®--.

Column 3, line 25, after "respective" delete "Lvibrational-" and substitute --vibrational- --;

line 34, after "48" delete "Lfocuses" and substitute --focuses--;

line 36, after "mately" change "$10^{12}$" to --$10^{-2}$--;

line 74, after "different" delete "from" and insert --than--.

Column 4, line 2, in the denominator of Equation (3), change "$\varepsilon_x$" to --$\varepsilon_\infty$--;

line 5, after "electron" delete "$\varepsilon_x$" and substitute --$\varepsilon_\infty$--;

line 27, delete Equation (4) and substitute the following equation:

$$\varepsilon_3 = \varepsilon(\infty) + \frac{\delta}{\omega_{TO}^2 - \omega_3^2} - \frac{\omega_p^2 \beta}{\omega_3^2 \beta^2 + \frac{\alpha^2}{\tau^2}}$$

UNITED STATES PATENT OFFICE
CERTIFICATE OF CORRECTION

Patent No. 3,617,764     Dated November 2, 1971

Inventor(s) Chandra K. N. Patel and Nguyen Van-Tran

It is certified that error appears in the above-identified patent and that said Letters Patent are hereby corrected as shown below:

Column 4, line 31, delete Equation (5) and substitute the following equation:

$$\alpha = 1 + \frac{\omega_3^2 \, \omega_c^2}{\frac{\omega_3^2}{\tau^2} + (\omega_3^2 - \omega_P^2)^2}$$

Column 4, line 36, delete Equation (6) and substitute the following equation:

$$\beta = 1 - \frac{\omega_c^2 (\omega_3^2 - \omega_P^2)}{\frac{\omega_3^2}{\tau^2} + (\omega_3^2 - \omega_P 2)^2}$$

Column 4, line 47, after "second" delete "terms" and substitute --term--;

line 49, at the beginning of the line, change "terms" to --term--;

line 75, delete in its entirety and substitute the following:

$$(\underset{\sim}{E}_{\omega_1, \omega_2} \text{ and } \underset{\sim}{k}_{1,2} \downarrow \underset{\sim}{B})$$

- 2 -

UNITED STATES PATENT OFFICE
CERTIFICATE OF CORRECTION

Patent No. 3,617,764          Dated November 2, 1971

Inventor(s) Chandra K. N. Patel and Nguyen Van-Tran

It is certified that error appears in the above-identified patent and that said Letters Patent are hereby corrected as shown below:

Column 5, line 1, after "two" delete "CO(43m)" and substitute --$CO_2$--;

line 4, after "95" delete "$cm^{11}$" and substitute --$cm^{-1}$--;

line 5, after "105" delete "$cm^{11}$" and substitute --$cm^{-1}$--;

line 6, after "$1.6 \times 10^{15}$" delete "$cm^{13}$" and substitute --$cm^{-3}$--, after "$2.2 \times 10^{15}$" delete "$cm^{13}$" and substitute --$cm^{-3}$--, after "$cm^2$" delete "$V^{11}$" and substitute --$V^{-1}$--;

Column 5, line 7, at the beginning of the line, delete "$sec.^{11}$" and substitute --$sec^{-1}$--;

Column 5, line 8, delete line 8, and substitute the following:

$\underset{\sim}{E}_{\omega_1}$, $\underset{\sim}{E}_{\omega_2}$ || <111>, and $\underset{\sim}{k}_1$, $\underset{\sim}{k}_2$ || $\underset{\sim}{\ell}$ ;

- 3 -

UNITED STATES PATENT OFFICE
CERTIFICATE OF CORRECTION

Patent No. 3,617,764    Dated November 2, 1971

Inventor(s) Chandra K. N. Patel and Nguyen Van-Tran

It is certified that error appears in the above-identified patent and that said Letters Patent are hereby corrected as shown below:

Column 5, line 12, after "100" delete "$cm^{11}$" and substitute --$cm^{-1}$--, after "with" delete superscript "1" and substitute --a--;

line 15, after "101" delete "$cm^{11}$" and substitute --$cm^{-1}$--;

line 16, after "944.15" delete "$cm^{11}$" and substitute --$cm^{-1}$--, after "1045" delete "$cm^{11}$" and substitute --$cm^{-1}$--;

line 17, after "1.6 x $10^{15}$" delete "$cm^{13}$" and substitute --$cm^{-3}$--;

line 28, after "of" insert -- ~ --, after "1.6 x $10^{15}$" delete "$cm^{13}$" and substitute --$cm^{-3}$--;

line 49, after "power" delete "101".

- 4 -

UNITED STATES PATENT OFFICE
CERTIFICATE OF CORRECTION

Patent No. 3,617,764          Dated  November 2, 1971

Inventor(s) Chandra K. N. Patel and Nguyen Van-Tran

It is certified that error appears in the above-identified patent and that said Letters Patent are hereby corrected as shown below:

Column 6, line 10, after "by" delete "Teflon" and insert --TEFLON®--.

Column 8, line 26, at the beginning of the line, delete "$\bar{4}3m$" and insert --($\bar{4}3m$)--.

Signed and sealed this 5th day of December 1972.

(SEAL)
Attest:

EDWARD M. FLETCHER, JR.          ROBERT GOTTSCHALK
Attesting Officer                Commissioner of Patents